Patented Apr. 8, 1952

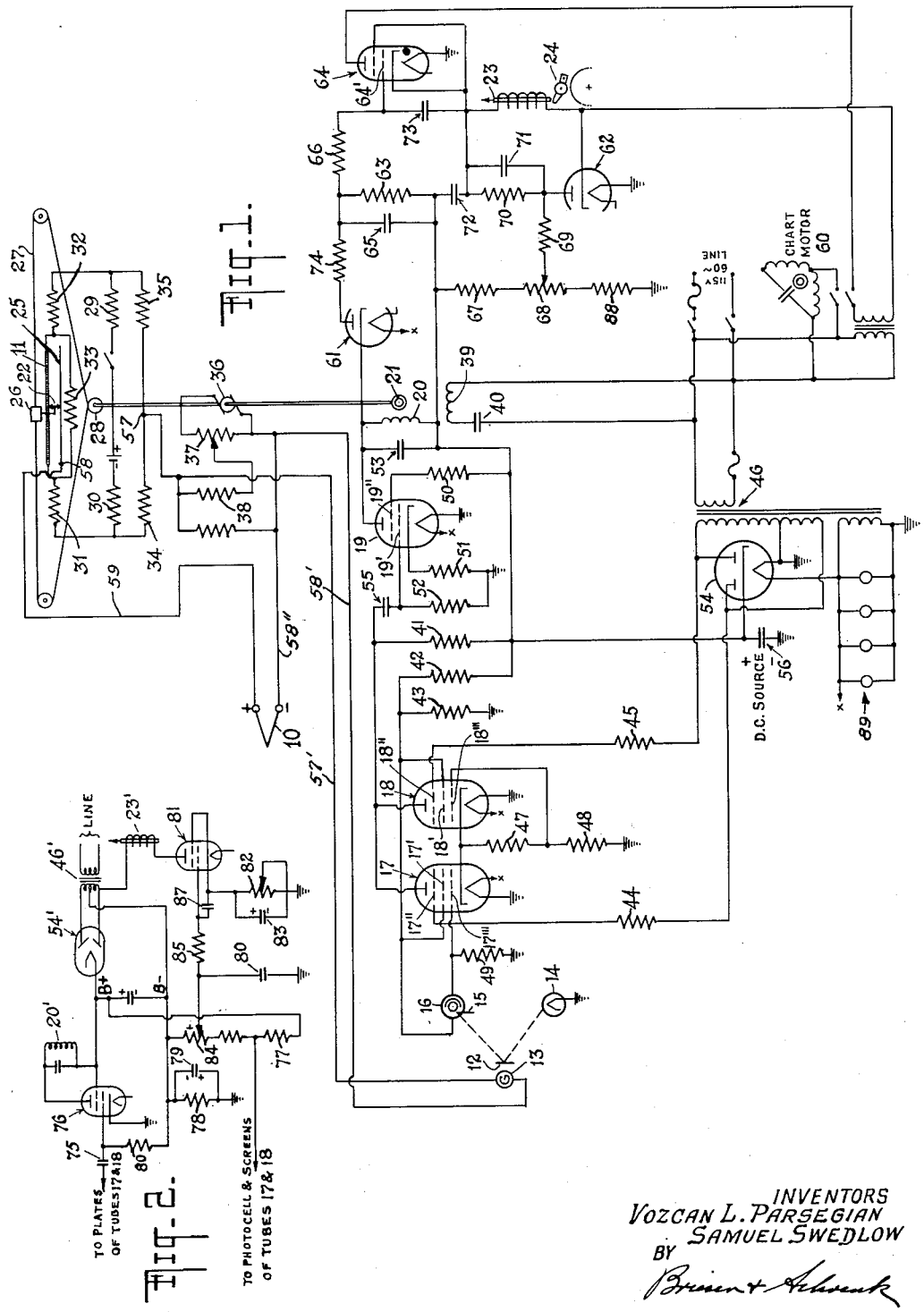

2,592,179

UNITED STATES PATENT OFFICE 2,592,179

RECORDING AND CONTROLLING SYSTEM

Vozcan L. Parsegian and Samuel Swedlow, New York, N. Y., assignors, by mesne assignments, to Weston Electrical Instrument Corporation, Newark, N. J., a corporation of New Jersey Application November 26, 1945, Serial No. 630,898

8 Claims. (Cl. 346—33)

1

This invention relates to improvements in apparatus for automatically recording and/or controlling a condition such as current, temperature, voltage, etc.

One of the objects of the invention is to provide such an apparatus which is capable of performing its functions with an extremely high degree of speed.

Another object of the invention is to provide such an apparatus which will operate smoothly and steadily instead of in the stepping fashion employed by many prior devices.

A further object of the invention is to provide such an apparatus with a high degree of sensitivity and accuracy, combined with reliability of operation, whether the apparatus is used in connection with a stationary system or subjected during its operations to motion or jar.

A still further object of the invention is to provide such a system which will be rugged and yet which will be simple in construction, will permit of a more compact type of design than prior systems of this type and will enable the replacement of parts with ease.

Other objects, as well as the advantages of the invention, will be apparent after a perusal of the following description when read in connection with the accompanying drawings in which Fig. 1 is a diagrammatic illustration of a preferred embodiment of the invention and Fig. 2 is a similar view showing a modified form of a portion of the system illustrated in Fig. 1.

In the system illustrated, the input voltage to be measured created either by a change in temperature of a thermocouple 10 or by any other suitable means responsive to changes in the condition being measured, is balanced against the E. M. F. of a slide wire 11 in a potentiometer circuit. When these correspond, a small mirror 12 mounted on the coil of a galvanometer 13 reflects a narrow beam of light from a light source 14 so that the reflected portion of the beam is split by a control edge 15 in front of a photocell 16. The reflected beam will accordingly be partly on and partly off the photocell 16 and this may be termed its "normal" position.

In the normal position of the reflected light beam two 6SJ7 pentode tubes 17 and 18 working together equally apply a current having a substantially 120 cycle wave form to a 6V6 power

2 amplifier tube 19 which in turn applies a low voltage across the auxiliary field coil 20 of a split phase motor 21. This voltage is insufficient to drive the motor 21 and the latter will remain stationary so long as this condition exists. Upon an increase or decrease of the input voltage being measured, the galvanometer 13 will deflect and cause less or more, respectively, of the reflected light beam to reach the photocell 16. As a result of this variation in the amount of light reaching the photocell 16 in one direction or the other, one of the tubes 17 or 18 will permit more conduction to its plate than will the other so that the resultant plate current output of the two tubes working together will be increased, but will have more nearly the form of a 60 cycle wave. The increased output of the tubes 17 and 18 will be translated by the power tube 19 into an amplified current in the auxiliary field coil 20 sufficient to cause the motor 21 to rotate. Whether the motor 21 will rotate in one direction or the other will depend upon the phase relation of the current reaching the auxiliary field coil 20, as will hereinafter be more fully explained. The motor 21 is connected to the sliding contact 22 of the slide wire potentiometer circuit so that when it rotates, it will move such sliding contact in a direction to balance the measured input voltage against the E. M. F. of the slide wire. When this is accomplished, a printing circuit comes into operation to cause a solenoid 23 to actuate the printing mechanism 24. The printing circuit is so designed that the solenoid 23 is operated at periods of one second so long as a balance is maintained in the potentiometer circuit.

Referring more particularly to the potentiometer measuring circuit, this is shown to be composed of the slide wire 11 and a return bar 25 against both of which the sliding contact or brush 22 bears. The sliding contact is mounted on a carriage 26 connected by an endless belt 27 and pulley 28 to the shaft of motor 21. The carriage 26 is slidably mounted for movement lengthwise of the slide wire 11 and return bar 25. As is customary, the potentiometer circuit also includes associated resistors and a battery to pass current through the slide wire 11 to establish a proper potential drop across it. The resistor 29 is a variable rheostat by means of which the battery current may be varied and corrections for battery voltage changes made from day to day. Thus with the resistor 29 and in combination with the series resistor 30 and the network involving resistors 31, 32 and the shunt resistor 33, it is possible to conduct the proper current through the slide wire 11 to establish the correct voltage drop across the slide wire as required by operating conditions. The lower branch of resistors 34 and 35 makes it possible to conveniently connect the negative pole of the voltage to be measured to the junction of such resistors, instead of to the lower left end of the slide wire 11, as viewed in Fig. 1, thus permitting the easy adjustment of the "zero input voltage" position at the low end of the slide wire to agree with the base line of the scale markings on the chart.

Also included in the potentiometer circuit is the galvanometer 13 which deflects the mirror 12 from its normal position when the input voltage is not exactly balanced by the E. M. F. of the slide wire 11. One side of the galvanometer 13 is connected through wire 57' to terminal 57 of the potentiometer circuit and the other side of the galvanometer is connected through wires 58' and 58", thermocouple 10 and wire 59 to one end 58 of the return bar 25. In a moving coil type of galvanometer, such as the galvanometer 13, whenever the coil rotates in its magnetic field there develops an opposing electromotive force within the coil which is proportional to the speed of its rotation and which causes the galvanometer to lag behind the rapid changes of the applied voltage. In the instant system of balancing, the galvanometer would similarly lag behind the sliding contact position during rapid motion of the carriage 26. To eliminate this delay a small reversible generator 36 is connected by means of a flexible coupling to the shaft of the motor 21 so that the generator will develop a voltage proportional to the speed of rotation of the motor and consequently proportional to the carriage speed. The voltage developed by the generator 36 is applied to the potentiometer circuit through the potential divider 37, which is a variable resistor having a value of 50 k. ohm, and the resistor 38 which is across the galvanometer and has a value of 40 k. ohm so that the generator voltage may annul the lag caused by the galvanometer's own back E. M. F. during the carriage travel. In practice the generator E. M. F. is preferably made a little larger than the galvanometer back E. M. F. to make up for lag in other components of the system.

When the galvanometer 13 deflects to indicate an unbalance between the measured input E. M. F. and the slide wire brush potential the balancing circuit must respond by driving the carriage motor 21 in the proper direction to restore balance. As has been previously mentioned, the motor 21 is a split phase motor, having two windings, of which the one main field coil 39 is energized and given a phase change of 90° by its connection to the line through the matching capacitor 40 having a value of 1 mfd., while the auxiliary field coil 20 is part of and energized by the amplifier balancing circuit. The direction of the motor rotation is determined by the phase relation of the currents in the two field coils, and it is the function of the amplifier circuit to develop sufficient current of the right phase relation to turn the motor in the proper direction when needed.

The amplifier balancing circuit as has been mentioned, includes the auxiliary field coil 20 which derives its power through the power amplifier tube 19, the output current and phase relation of which is controlled by the bias voltage imposed on its grid by the two tubes 17 and 18. It will be observed that the plates of the tubes 17 and 18 are connected together through a 510 k. ohm resistor 41 to the D. C. voltage source, that the two screen grids thereof, designated 17' and 18', respectively, are together connected to the junction of resistors 42 and 43 having values of 200 k. ohm and 160 k. ohm, respectively, to the D. C. voltage source, and that the cathode of the two tubes are tied together. It will be further observed that the auxiliary control grids 17" and 18", respectively, of the two tubes are connected through the 1 megohm resistors 44 and 45 to opposite ends of the secondary of a transformer 46. Thus the potential of each auxiliary control grid will be alternately negative and positive during each cycle in the line current or during each one-sixtieth of a second and at any given instant one auxiliary control grid will be at a negative potential and the other auxiliary control grid will be at an equal positive potential. The cycle variations of the auxiliary control grid potentials become translated into cyclic variations in the plate currents of the two tubes 17 and 18. Thus, when the control grids 17''' and 18''' of the tubes 17 and 18, respectively, are at equal biases with reference to their common cathode, each tube conducts equally during the positive swing of the A. C. line voltage applied to its auxiliary control grid and as the potential of each auxiliary control grid is reversed during each one-half cycle of the line voltage there will result a "balanced" plate current from such tubes having two pulses or cycles for each pulse or cycle of the line voltage. In other words, the plate current of the tubes 17 and 18 working together instead of having the 60 cycle wave form of the line voltage, will have a 120 cycle wave form as it passes through the .015 mfd. condenser 55 to the control grid 19' of the power amplifier tube 19. However, when one of the control grids 17''' or 18''' becomes more positive than the other, it will allow more conduction to its plate than will the other so that the pulse of the first will be substantially stronger than the pulse of the other in its next half cycle of the line voltage. The resultant plate current output of the two tubes 17 and 18, therefore, will have more nearly the form of a 60 cycle wave. The form of this wave will be dependent on how much conduction the grid of the other tube permits to its plate and will vary with the amount of light reaching the photocell 16 during a condition of unbalance, as will hereinafter become more clear. When the other tube conducts more than the first, the resultant plate current again resembles a 60 cycle wave as before, but with a phase difference of 180°. The transformer 46 also energizes the lamps 89 to provide scale and chart illumination.

It will be understood from the foregoing that when the system is in a condition of balance, the control grids 17''' and 18''' of the tubes 17 and 18, respectively, are at equal biases with respect to the common cathode, while when more or less light reaches the photocell 16 due to a condition of unbalance one or the other of such control grids becomes more positive. In the latter condition, not only are the peak voltages which reach the control grid 19' of the tube 19 increased, but the peaks are displaced a half wave apart depending on whether tube 17 or tube 18 conducts predominately. How this action is accomplished shall now be explained. It will be noted from Fig. 1 of the drawings, that the two cathodes of the tubes 17 and 18 are connected to ground through the common resistors 47 and 48 whose values are 9.1 k. ohm and 15 k. ohm, respectively. When plate current flows through these resistors 47 and 48 a voltage drop develops thereacross which makes the common cathode of positive polarity with respect to the ground connection. Or said differently, the ground connection is negative with reference to the common cathode connection. Then since the control grid 17''' of tube 17 is connected to the ground through a 50 megohm resistor 49, such control grid thereby becomes negatively biased with reference to the cathode. The tubes 17 and 18 are then said to be self biased by the introduction of resistors 47 and 48 in the cathode-to-ground connection.

The control grid of tube 17 and the cathode of photocell 16 are joined together and are both connected to the ground through the resistor 49. The anode of the photocell and the screen grids 17', 18' of the tubes 17, 18, respectively, are all given the D. C. voltage drop established across the 160 k. ohm resistor 43 by the connection to the D. C. voltage source through the 200 k. ohm resistor 42. Illumination falling on the photocell 16 permits current to flow through the photocell and the resistor 49, thus establishing a voltage drop across such resistor which is proportional to the photocell illumination. The direction of this voltage drop is such as to make the control grid 17''' of tube 17 more positive with respect to ground. It will thus be seen that the bias voltage of the control grid of tube 17 relative to its cathode is determined by the self-bias established across resistors 47, 48 by the plate current and by the opposing voltage developed across resistor 49 by the photocell and grid currents. Increasing the illumination makes the control grid of tube 17 more positive with respect to ground or less negative with respect to its cathode, tending to conduct more plate current through tube 17. On the other hand, the control grid 18''' of the tube 18 derives its bias voltage only from a portion of the cathode return. That is, its bias is proportional chiefly to the plate current flowing through the resistor 47. Therefore when the plate current increases due to the increased conduction of tube 17, the voltage across resistor 47 increases, making the control grid of tube 18 more negative with respect to the cathode and thereby decreasing the conduction through tube 18. Consequently, when more reflected light reaches the photocell due to a condition of unbalance of the system in one direction, less plate current is conducted through tube 18. When the illumination of the photocell is high, the plate current is mainly that due to the conduction through tube 17.

From the foregoing, it follows that when the condition of unbalance is such that the illumination on the photocell 16 is decreased, the grid bias of tube 17 becomes more negative, thereby reducing the plate current output of tube 17. The decreased plate current reduces the voltage across the resistor 47 and thereby makes the grid bias of tube 18 less negative relative to the cathode and consequently increasing the output of tube 18. It is clear therefore that decreasing the illumination on the photocell 16 causes the plate output to be predominately that due to conduction through tube 18. While this action is to some extent degenerative because of the common cathode return bias, a proper solution of potentials and associated resistors renders it possible to make the output voltage of the two tubes 17 and 18 proportional to the galvanometer deflection. When the illumination returns to a proper intermediate value with the reflected beam in its normal position, the two tubes 17 and 18 conduct equally, applying 120 cycle pulses to the power tube 19.

The power tube 19 has its plate connected through the auxiliary motor field 20 to the D. C. voltage source and its screen grid 19'' through the 18 k. ohm resistor 50 to the same D. C. source. The cathode of tube 19 is connected to ground through the self-biasing 150 ohm resistor 51 which provides some of the negative bias for its control grid 19 through the 0.5 megohm resistor 52. The A. C. pulses which develop in the output of the tubes 17 and 18 are transmitted to the control grid 19' of tube 19 through the .015 mfd. capacitor 55 and the variations of grid voltage become translated into amplified current changes in the plate and motor current to drive the motor. It will thus be seen that the power for the auxiliary field coil 20 is derived through the power amplifier tube 19, the output current and phase relation of which is controlled by the bias voltage imposed on its grid by the tubes 17 and 18 to drive the motor in one direction or the other. The 1 mfd. capacitor 53 in parallel with the field coil 20 is a tuning condenser which matches the motor field to establish optimum resonance conditions for 60 cycle current. The necessary direct current to operate the power tube 19 and to apply D. C. to the screen grids of the two tubes 17 and 18 and to the photocell 16 is derived from the rectifier 54 which develops the necessary high voltage across the 4 mfd. filter capacitor between the cathode of 54 and ground.

From the foregoing it will be understood that with the galvanometer mirror 12 in normal position, the reflected beam will be split by the control edge 15 and the control grids of the tubes 17 and 18 will be at equal biases with reference to their common cathode. The two tubes 17 and 18 will pass a balanced plate current of 120 cycle wave form through condenser 55 to the control grid 19' of the power amplifier tube 19 and the latter will maintain a low voltage across the auxiliary field coil 20. The motor 21 will accordingly remain in a stationary condition.

When a deflection of the coil of galvanometer 13 from normal occurs, mirror 12 will move with it, shifting the reflected light beam so that the amount of light impinging upon the photocell 16 will be varied. Upon an increase of the input voltage, due to an increase in the temperature of the thermocouple 10, the galvanometer turns its mirror 12 so that less or no light from the reflected beam will pass the control edge 15 to the photocell 16. In this condition, the grid bias of tube 17 is more negative relative to its cathode while the grid bias of the tube 18 is less negative relative to its cathode. The output of tube 17 is consequently decreased, while tube 18 will conduct more plate current. The resultant plate current having the form of a 60 cycle wave is transmitted to the control grid of tube 19 through the capacitor 55 and becomes translated into an amplified current change in the auxiliary field coil 20 such as to drive the motor in a direction to move the carriage 26 and consequently the brush 22 upscale towards a new balance point. As the generator 36 develops a voltage which annuls the lag caused by the galvanometer's own back E. M. F. during the carriage travel, the galvanometer coil will return steadily to a normal position as the brush 22 approaches the point on the slide wire where the measured input voltage is balanced by the E. M. F. of the slide wire. When that point is reached, the control grids of tubes 17 and 18 will again be at equal biases and such tubes will again pass a balanced plate current of 120 cycle wave form to the control grid of tube 19 whereupon the motor 21 will cease its operation.

When there is a decrease of the voltage input, due to a decrease in the temperature of the thermocouple 10, the galvanometer turns mirror 12 to increase the amount of light reaching the photocell 16. As has been explained, the increased current flow through the photocell causes the control grid 17''' of tube 17 to become more positive and the control grid of tube 18 more negative with respect to the common cathode. The output of tube 17 will be consequently increased and that of tube 18 will be decreased so that the resultant plate current while having the form of a 60 cycle wave will be 180° out of phase with the current passed by such tubes when tube 18 is conducting predominately. The motor 21 will consequently be rotated in a reverse direction to drive the brush 22 downscale to a position on the slide wire where the lower input voltage will be balanced by the E. M. F. of the slide wire. It will be noted that as in these balancing operations of the amplifier circuit, the galvanometer does not lag behind the brush position and the response of the amplifier circuit is practically instantaneous, the galvanometer will not swing beyond its normal position to recreate a condition of unbalance but will come steadily and surely to the balance point. Consequently, the instant system will not approach the balance point with a step-by-step action, but will move quickly and surely to such point. As a result of this method of operation, it has been found that the instant instrument has a speed much higher than any known instrument of corresponding accuracy and with the simplicity of construction of the instant device. Tests have demonstrated that it may be made to work accurately and reliably with a chart traversing time of one second. As there are no limitations in the amplifier portion of the system, it operating practically instantaneously, it is possible to reduce the chart traversing time of the system to a portion of a second.

Having described the potentiometer and amplifier balancing circuits of the system, we now turn to a description of the printing circuit. As has been previously mentioned, the purpose of the printing circuit is to energize the solenoid 23 which actuates the chart-printing mechanism 24 when the carriage 26 reaches a new balance point, and to repeat the printing at one second intervals thereafter so long as the carriage is in balance.

The principal units of the printing circuit include the solenoid 23, a double diode 6H6 and a 2D21 thyratron. The solenoid 23 as well as the printing mechanism 24 are mounted on the carriage 26 which also carries the brush 22, a suitable arrangement of such elements being disclosed in Patent No. 2,528,015, dated Oct. 31, 1950, for Recording Apparatus. Thus when the carriage 26 is moved in one direction or the other by the motor 21 through endless belt 27 and pulley 28, the printing mechanism and the solenoid, which is preferably positioned above such mechanism in position to operate the same when the solenoid is energized, are carried across the chart positioned below and fed by means of the chart motor 60.

The first half of the double diode tube is designated in Fig. 1 of the drawings by the numeral 61 and the second half thereof by the numeral 62. As will be noted, the half 61 of the diode and its series resistors 74 and 63 and capacitor 65 form a shunt across the motor auxiliary field coil 20. The voltage which develops across the field coil 20 will pass current only in one direction through the diode 61 and thus rectify the current in the usual manner. It is observed, that capacitor 65 is shunted by the resistor 63, so that unidirectional or rectified current passing through the diode 61 will flow partly through capacitor 65 and partly through resistor 63. If the resistor 63 has a large impedance as compared with the impedance of capacitor 65 more of the current will pass through the latter, giving rise an accumulated electric charge in the capacitor 65 and thereby a voltage across its terminals and across the terminals of resistor 63 which is proportional to the voltage drop existing across the field coil 20. This voltage rises and falls as the motor 21 is turned or stands still. When the motor 21 is operating the voltage across resistor 63 impresses such a negative bias on the control grid 64' of the thyratron 64 that such tube is prevented from firing. On the other hand, when the motor has ceased to turn and a relatively small current is passing from field coil 20 through the diode half 61, the bias of the control grid 64' is such that the tube 64 will fire. Arranged in parallel with the resistor 63 is a 25 mfd. capacitor 65, across which a high potential drop is developed while the motor 21 is running. As the brush 22 nears its position of balance, the voltage in the field coil 20 drops quickly to a point slightly above the voltage of such coil when its circuit is in balance and then gradually approaches the latter. As it is desirable that the amplifier balancing circuit reach exact balance before printing, capacitor 65 during such last mentioned interval discharges the voltage built up in it across resistor 63 to insure that the control grid 64' is maintained sufficiently negative to prevent the firing of tube 64 until the voltage in field coil 20 has fallen to the point where the amplifier balancing circuit is in exact balance and motor 21 will cease its operation. The capacity of condenser 65 is such that when it has completed its discharge, the amplifier and potentiometer circuits will have just arrived at balance and the bias of the grid of tube 64 is such as to cause the tube 64 to fire.

The thyratron 64 is fired when its control grid voltage has a negative bias of less than a few volts with reference to its cathode. It will be observed that the grid bias relative to the cathode is determined by the algebraic sum of all the voltages in the connecting circuit, including the 1 megohm resistor 66, resistor 63, the 300 k. ohm resistor 67, the 70 k. ohm resistor 68, the 2 megohm resistor 69 and the 3.0 megohm resistor 70. Of these, the resistors 69 and 66 serve primarily as current-limiting resistors and the principal voltage drops occur across the other resistors. When the motor is stopped in the balance position the voltage across resistor 63 is of the order of thirty or more volts, and its negative end is connected through resistor 66 to the thryratron control grid 64'. It would be impossible for the tube 64 to fire at all if this high voltage were not counter balanced with an opposing voltage, as through resistors 67 and 68, to reduce the negative bias of its control grid. The purpose of the resistors 67 and 68 therefore, is to make the bias of the control grid of tube 64 definitely positive to insure firing when exact balance is reached. As has been explained this condition is attained with the current voltage passing through the field coil 20 when the amplifier circuit is balanced. As soon as the motor begins to travel however, the voltage across resistor 63 rises to such a high value, over 120 volts, that firing of tube 64 is prevented. Resistor 88 is a fixed resistor to bring the voltage up to the point desired.

The thyratron 64 on firing passes a heavy current through the solenoid 23 causing its core to actuate the printing mechanism and thereby make a mark on the chart. When the tube 64 is fired it would normally continue to pass current through the solenoid and thereby maintain the printing mechanism in actuated position unless something is done to quench it by making its grid more negative. This is accomplished by impressing the high voltage developed across the solenoid when the tube 64 is fired, across the second half 62 of the diode tube which together with the associated capacitors and resistors combine to quickly quench the thyratron 64 and to limit repeated firing to intervals of one second. It will be seen from the circuit that the high potential developed across the solenoid 23 passes current through the second half 62 of the diode to quickly develop a large potential drop across the resistor 70 and the small .1 mfd. capacitor 71. The one negative junction of resistor 70 and capacitor 71 connects through resistors 69, 68, 67, 63 and 66 to the grid 64' of the thyratron. Therefore the high voltage drop developed across capacitor 71 causes a negative surge to reach the grid 64' which quickly quenches the thyratron after only two cycles of current have passed through the solenoid. The thyratron is not permitted to fire again until the voltage across the capacitor 71 has become sufficiently lost by discharging through resistor 70. This cycle is repeated so long as the amplifier circuit remains in balance and the motor remains stationary. It will be noted that the period required to discharge the capacitor 71 through resistor 70, which is of the order of one second, is the main controlling element in determining the interval between successive firing of the thyratron 64, while the speed with which the negative surge is carried through the resistors 69, 66 to charge the .1 mfd. capacitor 72 and the .05 mfd. capacitor 73 determine in large part the duration of each firing pulse. The capacitor 72 and the resistor 69 make for a more uniform and stable printing interval and duration of firing. Similarly resistor 66 and capacitor 73 tend to stabilize the overall performance by imposing a small delay in the thyratron grid voltage changes to prevent erratic behavior which might arise from following rapid voltage changes which develop across resistor 63 or elsewhere in the circuit. Also the choice of the 2 megohm resistor 74, resistor 63 and of capacitor 65 is such as to reduce the voltage across resistor 63 (by increasing resistor 74) and to increase the time constant of the combination of resistor 63 and capacitor 65 (by increasing capacitor 65) so that small changes of amplifier output voltage do not cause effective changes of the voltage across resistor 63. This characteristic is needed where the system is employed in a radiosonde recorder because at times the incoming signals (input voltages to measured) are very erratic and it is not desirable to have the carriage too sensitive to these erratic oscillations. Resistor 68 is made adjustable so that under certain conditions, the voltage across the same can be increased to continue the printing even though the carriage may oscillate due to erratic signal conditions. Actually the functions of the capacitors and resistors are not clearly separable and independent, since a variation of almost any resistor or capacitor value in the circuit effects some degree of variation in more than one characteristic of the printing circuit. The final choice of values is dictated by the degree of sensitivity to unbalance, duration of printing stroke, and printing interval desirable in any application of the recorder.

While it is believed that an understanding of the operation of the printing circuit will be obtained from the foregoing description of this circuit, it might be well to point out that when the amplifier circuit is unbalanced and the tubes 17 and 18 are delivering an increased current having the form of a 60 cycle wave to the power tube 19 to cause the motor 21 to rotate in one direction or the other, the negative bias on the grid 64' of the thyratron is too high to permit firing of this tube. Just as soon however, as an exact balance is attained in the amplifier and potentiometer circuits the negative bias on the control grid of the thyratron 64 will drop to such a degree as to cause such tube to fire. The thyratron on firing passes a heavy current through the solenoid thus causing the printing mechanism to be actuated. The high voltage developed across the solenoid when the thyratron is fired, is utilized to quickly quench the thyratron and to limit repeated firing to intervals of one second. It will thus be seen that in its operation the printing circuit accomplishes three functions, namely, it causes a printing operation to take place as soon as an exact balance is reached in the amplifier and potentiometer circuits after a condition of unbalance, it makes the mechanical printing operation extremely short and it repeats the printing operation at predetermined intervals so long as a condition of balance exists in the amplifier and potentiometer circuits.

While we have illustrated in Fig. 1 of the drawings and hereinabove described a preferred embodiment of our invention, it will be evident to those skilled in the art that various modifications and changes may be made without departing from the spirit of the invention. As an example, there is illustrated in Fig. 2 of the drawings, a modification of the printing circuit which has been found suitable for carrying out the purpose of the invention. In the use of this modified printing circuit, it is preferred that the last part of the previously described amplifier balancing circuit including the resistors 41, 42, 43, 50, 51 and 52, capacitor 55 and power tube 19 be replaced by a slightly different arrangement. As is shown in Fig. 2 of the drawings, the plates of the tubes 17 and 18 are connected through a .03 mfd. capacitor 75 to the control grid of a 6L6 power amplifier tube 76, while the photocell 16 and screen grids of tubes 17 and 18 are connected to the D. C. source through a 62 k. resistor 77. Thus, as in the circuit previously described, the control grid of the tube 76 has impressed across it the output voltage from the tubes 17 and 18, with a phase and voltage condition which depends on the balance or unbalance of the slide wire brush 22. Also as in the previously described circuit, the plate of the tube 76 and the auxiliary field coil 20' of the motor drive their power by connection to the rectified voltage source, indicated, as B+ and B—, which is developed by the 5Y3 rectifier 54'. It will be observed that the B— terminal instead of connecting directly to ground as in the previously described circuit, connects to ground through the 1 k. resistor 78, shunted by the large 40 mfd. capacitor 79. As in the previously described circuit also the suppressor grids of the two tubes 17 and 18 are connected to similar resistors 44 and 45 to opposite ends of the secondary of the transformer 46', such connection not being shown in Fig. 2 for the sake of clearness.

In the circuit of Fig. 2 therefore, the electronic current flows from the cathode and plate of the tube 76, through the motor auxiliary field coil 20' to the B+, then completes the circuit by continuing from B— through resistor 78 to the ground and cathode of tube 76 again. The control grid of tube 76 is given a normally negative bias by the voltage drop across resistor 78 and the 1 megohm resistor 80.

The capacitor 79 shunting resistor 78 permits the sinusoidal component of the A. C. motor current to pass through without much impedance. However, if the amplifier output is such that the motor current is not symmetrical in its wave form, the capacitor 79 becomes further charged, so that the voltage across resistor 78 increases when the plate current of tube 76 increases. The voltage across resistor 78 therefore is low when the motor is not turning, and is higher when the motor is driving the carriage to a new balance. This change of voltage may then be used to control the printing operation.

As in the previous embodiment the actual printing circuit employs a 2D21 thyratron 81 and a solenoid 23'. The power required to operate the solenoid 23' and the thyratron 81 is derived from the secondary of the transformer 46'. The plate of the tube 81 connects through the solenoid 23' to the one end of the transformer secondary, while the cathode of the tube 81 is connected to ground through the 60 k. variable resistor 82, shunted by the large 10 mfd. capacitor 83, and the circuit to the center top of the transformer secondary is completed from ground through resistor 78 and capacitor 79.

The voltage across resistor 78 may be about 10 volts when the carriage is at balance, and about 20 volts when the carriage is traveling. Since the thyratron 81 is fired only when its grid has a negative bias of not more than a few volts with reference to its cathode, it becomes necessary to reduce the effect of the 10 volts across resistor 78 with an opposing voltage drop through a 25 k. resistor 84. The grid bias before the tube 81 is fired is then principally due to the algebraic sum of the voltage across resistor 78 and the opposing potential drop taken from between the negative end and brush of the potential divider 84. There is no voltage across resistor 82 between the cathode and ground until tube 81 fires. Resistor 84 is originally adjusted to permit firing of the tube 81 when the carriage is at balance.

When the thyratron 81 is fired, the heavy surge of current through the large capacitor 83 charges it to a high potential. This potential acts as a self bias to quench the thyratron as soon as the 5 megohm resistor 85 and the capacitor 80 and 87 having values of .05 mfd. and .1 mfd., respectively, permit the control grid of tube 81 to become sufficiently negative with reference to such tubes cathode. The duration of the firing pulse is determined in large part by the choice of resistor 85, capacitor 80, 87 and 83 and resistor 82 which shunts capacitor 83. This duration may be 1/60th of a second or longer. The tube 81 will not be fired again until the charge developed across capacitor 83 has been discharged through resistor 82 and the low grid bias is again restored. For example, the discharge may be adjusted to require one second or longer before the firing is repeated, depending on the time constant of the combination of the capacitor 83 and the adjustable resistor 82. The capacitor 86 and 87 tend to stabilize the overall performance of the printing operation. When the condition of balance in the amplifier and potentiometer circuits has been replaced by a condition of unbalance and the carriage 26 is traveling to a new balance position, the voltage across the resistor 78 increases sufficiently to prevent firing of the thyratron 81 until balance is reached.

We claim:

1. In a self-balancing measuring system, means for maintaining the system in a condition of balance including a motor provided with a main field coil and an auxiliary field coil, and means for impressing across said auxiliary field coil a magnitude of voltage corresponding to the departure from a condition of balance of the system, a control circuit including a thyratron tube electrically connected to said auxiliary field coil, means for impressing on the control grid of said tube a magnitude of negative bias corresponding to the magnitude of voltage in said auxiliary field coil, said thyratron tube being so arranged in the control circuit that it fires when its control grid has a predetermined minimum magnitude of negative bias corresponding to the balanced condition of the system, a solenoid having its coil connected to said tube to receive a heavy current passed by said tube on the latter's firing and rendered operable by said current, means operatively controlled by said solenoid, means electrically connected to said solenoid coil and rendered operative by a high voltage across said solenoid for quickly impressing on the grid of said tube a negative bias such as will quench the tube, and means in said control circuit for maintaining said additional bias on said tube for a predetermined time interval.

2. In a self-balancing measuring or controlling system, a split phase motor having an auxiliary field coil connected to a source of direct current and a main field coil, means controlled by the motor for restoring the system to normal condition when unbalanced, a circuit including said auxiliary field coil, amplifying means consisting of a single pentode tube connected directly to said auxiliary field coil to control the flow of direct current or alternating current to the field coil, double pentode tubes connected to and controlling the output and phase relation of the current from said amplifying means, a transformer having the opposite ends of its secondary connected to the auxiliary control grids of said double pentodes, a source of rectified current connected to said amplifying means and to the plates of said double pentodes, and radiant energy responsive means connected to said double pentodes to control the output and phase relation of the current from said double pentodes to said amplifying means, said radiant energy means being connected to cause said double pentodes to conduct a balanced plate current of one wave form when said system is balanced and to conduct current of a different wave form when said system is unbalanced, the phase relation of the latter mentioned current being dependent upon the direction of unbalance of the system.

3. In a self-balancing measuring system, marking means for producing a record on a chart, a circuit including a solenoid rendered operable by current passed therethrough to actuate said marking means to produce such record, means rendered operable by a balanced condition in the system for passing a heavy current through said solenoid to operate the latter, and means electrically connected to said solenoid and to said current passing means and rendered operative by the high voltage developed across said solenoid to quickly stop the passage of the heavy current from said current passing means to said solenoid even though the initiating condition of balance in the system continues, said last mentioned means including voltage control means arranged to enable said current passing means to pass a successive charge of heavy current through the solenoid at a predetermined interval after such stoppage if such initial condition of balance in the system is present at the end of such time interval, whereby said marking means is again actuated to produce a record at the end of said predetermined interval.

4. In a self-balancing measuring system, a marking device for producing a record on a chart, a circuit including means operable to actuate said device to produce such record, means rendered operable by a balanced condition in the system for actuating said marking device operating means, means controlled by said marking device operating means and operable on actuation of the latter to render said second mentioned means inoperative to actuate said marking device operating means even though the initiating condition of balance in the system continues, and means connected to and coacting with said controlled means for maintaining said second mentioned means inoperative for a predetermined time interval if the system remains in such initial condition of balance.

5. In a self-balancing electrical measuring system, a tube capable of passing a heavy current when fired, means responsive to conditions of balance in said system for impressing on the control grid of said tube a magnitude of negative bias corresponding to the condition of balance of the system, means electrically connected to said tube enabling the latter to fire when the negative bias of its control grid is at a predetermined minimum magnitude corresponding to the balanced condition of the system, a solenoid arranged to receive the heavy currents passed by said tube when the latter is fired, a normally inoperative printing device operable by said solenoid to produce a record when such heavy current is passed through the latter, means electrically connected to said solenoid and tube and operable by a high voltage developed across said solenoid during such surge of heavy current to quickly impress on the control grid of said tube an increased bias such as will quench it, thereby restoring said solenoid to non-printing position, means for maintaining such increased bias on said tube for a predetermined time interval after it has been quenched, and means for restoring the bias of the control grid to a voltage at which the tube will again fire if the system remains in a balanced condition at the end of such interval, thereby causing said solenoid to again actuate said printing device to produce a record.

6. In a self-balancing electrical measuring system, recording means for producing a record on a chart, means sensitive to conditions of balance in the system for actuating said recording means to produce a record when the system is in exact balance, means for rendering said sensitive means inoperative to maintain said recording means in printing position as soon as said recording means has been actuated, and means connected to said sensitive means and to said third mentioned means and rendered operative by the latter even though the said condition of exact balance in said system continues, to maintain said sensitive means in such inoperative condition for a predetermined time interval and enabling said sensitive means to again actuate said recording means to produce a record if the said condition of exact balance in said system is present at the end of said time interval.

7. In a self-balancing electrical measuring system, means for maintaining the system in a condition of balance including a reversible motor provided with an auxiliary field coil and means for impressing across said auxiliary field coil a magnitude of voltage corresponding to the condition of balance of the system, a tube capable of passing a heavy current when fired connected to said auxiliary field coil, means intermediate said coil and tube for impressing on the control grid of the latter a negative bias corresponding in magnitude to the magnitude of voltage in said auxiliary field coil, said tube being arranged to fire when the negative bias of its control grid is at a predetermined minimum magnitude corresponding to a condition of exact balance of the system, printing means for producing a record on a chart, a solenoid arranged to receive the heavy currents passed by said firing tube and to actuate said printing means to produce a record when said tube is fired, means connected to said solenoid and said tube and operable by the high voltage developed across the the former when the tube is fired and as the said condition of exact balance in said system continues, to pass to the control grid of the latter a negative surge such as will quench such tube and thereby restore said solenoid to non-printing position, said last mentioned means including a capacitor arranged to prevent refiring of said tube for a predetermined time interval even though the said condition of exact balance in said system continues, whereby said solenoid is maintained inoperative to actuate said printing means to produce a record during such time interval.

8. In a self-balancing measuring system, a measuring instrument having a normally inoperative marking device, means for operating the marking device of said measuring instrument, means rendered operative by a condition of exact balance in the system for actuating said instrument operating means, means controlled by and operable on actuation of said instrument operating means to render said second mentioned means inoperative as the said condition of exact balance in said system continues, and means operable with said controlled means for restoring the operableness of said second mentioned means after a predetermined time interval if the said condition of exact balance in said system is present at the end of such time interval, whereby said instrument operating means is again actuated to operate the marking device of said measuring instrument to produce a record.

VOZCAN L. PARSEGIAN.
SAMUEL SWEDLOW.

REFERENCES CITED

The following references are of record in the file of this patent:

UNITED STATES PATENTS

| Number | Name | Date |
|---|---|---|
| 1,977,256 | Swart | Oct. 16, 1934 |
| 2,092,851 | Osgood | Sept. 14, 1937 |
| 2,211,114 | Harrison | Aug. 13, 1940 |
| 2,222,947 | Harrison | Nov. 26, 1940 |
| 2,355,537 | Jones | Aug. 8, 1944 |
| 2,375,159 | Wills | May 1, 1945 |
| 2,376,513 | Shaffer | May 22, 1945 |
| 2,388,769 | Shaffer | Nov. 13, 1945 |
| 2,392,916 | Gruss | Jan. 15, 1946 |
| 2,404,891 | Schmitt | July 30, 1946 |
| 2,427,355 | Keinath | Sept. 16, 1947 |
| 2,477,062 | Jacobi | July 26, 1949 |
| 2,485,730 | Griffen et al. | Oct. 25, 1949 |

OTHER REFERENCES

General Elec. Co. Research Lab. Pamphlet, Hot-Cathode Thyratram, June 1930, No. 491, pages 17, 21 and 22, figures 27, 39 and 40.